United States Patent [19]

Covitch

[11] 4,434,116
[45] Feb. 28, 1984

[54] METHOD FOR MAKING A POROUS FLUORINATED POLYMER STRUCTURE

[75] Inventor: Michael J. Covitch, Cleveland Hts., Ohio

[73] Assignee: Diamond Shamrock Corporation, Dallas, Tex.

[21] Appl. No.: 277,884

[22] Filed: Jun. 26, 1981

[51] Int. Cl.³ .............................................. B29D 27/00
[52] U.S. Cl. ........................................ 264/49; 264/41; 264/101; 264/216; 264/299; 264/331.14; 521/27; 521/30; 521/33; 524/805
[58] Field of Search .................. 264/49, 41, 216, 299, 264/331.14, 101; 521/27, 30, 33; 524/805

[56] References Cited

U.S. PATENT DOCUMENTS

| | | | |
|---|---|---|---|
| 2,393,967 | 2/1946 | Brubaker | 526/229 X |
| 2,559,752 | 7/1951 | Berry | 526/234 X |
| 2,593,583 | 4/1952 | Lontz | 528/481 X |
| 2,792,377 | 5/1957 | Miller | 264/331.14 X |
| 3,041,317 | 6/1962 | Gibbs et al. | 521/30 X |
| 3,282,875 | 11/1966 | Connolly et al. | 524/805 X |
| 3,297,484 | 1/1967 | Niedrach | 136/86 |
| 3,560,568 | 2/1971 | Resnick | |
| 3,624,053 | 11/1971 | Gibbs et al. | 521/33 X |
| 3,642,668 | 2/1972 | Bailey et al. | 264/41 X |
| 3,718,627 | 2/1973 | Grot | 526/243 X |
| 3,770,547 | 11/1971 | Kelsey | |
| 3,784,399 | 1/1974 | Grot | |
| 3,798,063 | 3/1974 | Decraene | 117/230 |
| 3,925,135 | 12/1975 | Grot | 156/308.2 X |
| 4,025,439 | 5/1977 | Kamada et al. | 264/49 X |
| 4,039,409 | 8/1977 | La Conti et al. | |
| 4,056,452 | 11/1977 | Campbell | 204/266 X |
| 4,057,479 | 11/1977 | Campbell | 204/266 X |
| 4,116,888 | 9/1978 | Ukihashi et al. | 521/27 X |
| 4,119,581 | 10/1978 | Rembaum et al. | 521/27 |
| 4,147,844 | 4/1979 | Babinsky et al. | 521/27 |
| 4,151,053 | 4/1979 | Seko et al. | 204/98 |
| 4,188,354 | 2/1980 | Munari et al. | 264/41 X |
| 4,203,848 | 5/1980 | Grandine | 264/41 X |
| 4,209,368 | 6/1980 | Coker et al. | 204/98 |
| 4,210,501 | 7/1980 | Dempsey et al. | 204/129 |
| 4,212,714 | 7/1980 | Coker et al. | 204/98 |
| 4,214,958 | 7/1980 | Coker et al. | 204/98 |
| 4,262,041 | 4/1981 | Eguchi et al. | 521/27 X |
| 4,267,364 | 5/1981 | Grot et al. | 521/27 X |
| 4,298,697 | 11/1981 | Baczek et al. | 521/27 |
| 4,298,699 | 11/1981 | Asawa et al. | 521/27 X |

FOREIGN PATENT DOCUMENTS

| | | |
|---|---|---|
| 52-38486 | 3/1977 | Japan . |
| 2014585A | 2/1979 | United Kingdom . |
| 2009788 | 6/1979 | United Kingdom . |
| 2009792 | 6/1979 | United Kingdom . |
| 2009795 | 6/1979 | United Kingdom . |

OTHER PUBLICATIONS

Whittington's Dictionary of Plastics by Lloyd R. Waittington, Stamford, Conn., Technomic, 1968, p. 239.
Hackh's Chemical Dictionary, Fourth edition, Completely Revised and edited by Julius Grant, New York, McGraw-Hill, ®1972, p. 674.
The Condensed Chemical Dictionary, Tenth edition, Revised by Gessner G. Hawley, New York, Van Nostrand Reinhold, ®1981, p. 1016.
Smith, P. and A. J. Pennings, "Eutectic Crystallization of Pseudo Binary Systems of Polyethylene and High Melting Diluents", In *Polymer*, vol. 15, Jul. 1974, pp. 413–419.

*Primary Examiner*—Philip E. Anderson
*Attorney, Agent, or Firm*—Bruce E. Harang

[57] ABSTRACT

A method is shown for making porous thermoresin structures. By the method, the thermoresin is at least partially solvated, formed into a desired shape, and cooled until droplets of the solvent form by syneresis within the shape. Further cooling crystalizes the droplets. These crystalized droplets are subsequently removed to leave a porous structure.

15 Claims, No Drawings

METHOD FOR MAKING A POROUS FLUORINATED POLYMER STRUCTURE

FIELD OF THE INVENTION

This invention relates to methods for making porous fluorinated polymer structures. More specifically, this invention relates to methods employing pore precursors for making porous fluorinated polymer structures.

BACKGROUND OF THE INVENTION

It is occasionally desirable that a fluorinated polymer structure be porous. Such porous structures can be used in diverse applications such as in filtration, for porous diaphragms, and for reducing weight in fluorinated polymer structures. Porosity can increase the available surface area of a fluorinated polymer structure utilized for supporting a catalyst and thus considerably enhance catalyst loading capabilities for a particular fluorinated polymer structure supporting a catalyst where surface effects are of importance.

A variety of techniques are known for forming pores in a fluorinated polymer structure. In one technique, an expandable pore precursor is introduced into the fluorinated polymer. The precursor is then subjected to an environment, usually an elevated temperature, whereby the pore precursor grows substantially in size, forming a pore within the fluorinated polymer. Frequently such precursors then escape from the structure through interlocking pores or are removed in any of a number of well-known suitable or conventional manners.

In another technique, a particulate pore precursor is blended into a fluorinated polymer. The particulate is selected to be of approximately dimensions desired in pores in the completed fluorinated polymer structure. Following completion of the fluorinated polymer structure, the pore precursors are removed using well-known techniques such as chemical leaching and the like. Removal of the pore precursors leaves the fluorinated polymer structure porous.

For some fluorinated polymers, heat activation of a pore precursor may damage or degrade the fluorinated polymer structure. Where the fluorinated polymer is possessed of special physical properties such as ionic exchange functionality, heat activation of a pore precursor can significantly effect those special physical properties.

Particularly, heat activation can adversely effect cationic exchange properties of certain resins utilized frequently for fabrication of cationic exchange membranes. One copolymeric ion exchange material finding particular acceptance has been fluorocarbon vinyl ether copolymers known generally as perfluorocarbons and marketed by E. I. duPont under the name Nafion ®.

These so-called perfluorocarbons are generally copolymers of two monomers with one monomer being selected from a group including vinyl fluoride, hexafluoropropylene, vinylidene fluoride, trifluoroethylene, chlorotrifluoroethylene, perfluoro(alkylvinyl ether), tetrafluoroethylene and mixtures thereof.

The second monomer is selected from a group of monomers containing an $SO_2F$ or sulfonyl fluoride group. Examples of such second monomers can be generically represented by the formula $CF_2=CFR_1SO_2F$. $R_1$ in the generic formula is a bifunctional perfluorinated radical comprising one to eight carbon atoms. One restraint upon the generic formula is a general requirement for the presence of at least one fluorine atom on the carbon atom adjacent the $-SO_2F$, particularly where the functional group exists as the $-(-SO_2NH)mQ$ form. In this form, Q can be hydrogen or an alkali or alkaline earth metal cation and m is the valence of Q. The $R_1$ generic formula portion can be of any suitable or conventional configuration, but it has been found preferably that the vinyl radical comonomer join the $R_1$ group through an ether linkage.

Typical sulfonyl fluoride containing monomers are set forth in U.S. Pat. Nos. 3,282,875; 3,041,317; 3,560,568; 3,718,627 and methods of preparation of intermediate perfluorocarbon copolymers are set forth in U.S. Pat. Nos. 3,041,317; 2,393,967; 2,559,752 and 2,593,583. These perfluorocarbons generally have pendant $SO_2F$ based functional groups. Perfluorocarbon copolymers containing perfluoro(3,6-dioxa-4-methyl-7-octenesulfonyl fluoride) comonomer have found particular acceptance in $Cl_2$ cells.

Presently, perfluorocarbon membranes, for example, are generally fabricated by forming a thin membrane-like sheet under heat and pressure from one of the intermediate copolymers previously described. The ionic exchange capability of the copolymeric membrane is then activated by saponification with a suitable or conventional compound such as a strong caustic. Generally, such membranes are between 0.5 mil and 150 mil in thickness. Reinforced perfluorocarbon membranes have been fabricated, for example, as shown in U.S. Pat. No. 3,925,135.

These membranes have been utilized in electrochemical cells. Notwithstanding the use of such membrane separators, a remaining electrical power inefficiency in many batteries, fuel cells and electrochemical cells has been associated with a voltage drop between the cell anode and cathode attributable to passage of the electrical current through one or more electrolytes separating these electrodes remotely positioned on opposite sides of the cell separator.

Recent proposals have physically sandwiched a perfluorocarbon membrane between an anode-cathode pair. The membrane in such sandwich cell construction functions as an electrolyte between the anode-cathode pair, and the term solid polymer electrolyte (SPE) cell has come to be associated with such cells, the membrane being a solid polymer electrolyte. In some of these SPE proposals, one or more of the electrodes has been a composite of a fluororesin polymer such as Teflon ®, E. I. duPont polytetrafluoroethylene (PTFE), with a finely divided electrocatalytic anode material or a finely divided cathode material. In others, the SPE is sandwiched between two reticulate electrodes. Typical sandwich SPE cells are described in U.S. Pat. Nos. 4,144,301; 4,057,479; 4,056,452 and 4,039,409. Composite electrode SPE cells are described in U.S. Pat. Nos. 3,297,484; 4,212,714 and 4,214,958 and in Great Britain patent application Nos. 2,009,788A; 2,009,792A and 2,009,795A.

Use of the composite electrodes can significantly enhance cell power efficiency. However, drawbacks associated with present composite electrode configurations have complicated realization of full efficiency benefits. Composite electrodes generally are formed from blends of particulate PTFE TEFLON and a metal particulate or particulate electrocatalytic compound. The PTFE blend is generally sintered into a decal-like patch that is then applied to a perfluorocarbon membrane. Heat and pressure are applied to the decal and membrane to obtain coadherence between them. A heating process generating heat sufficient to soften the PTFE for adherence to the sheet can present a risk of heat damage to the membrane.

These PTFE TEFLON based composites demonstrate significant hydrophobic properties that can inhibit the rate of transfer of cell chemistry through the composite to and from the electrically active component of the composite. Therefore, TEFLON content of such electrodes must be limited. Formation of a porous composite has been proposed to ameliorate the generally hydrophobic nature of the PTFE composite electrodes, but simple porosity has not been sufficient to provide results potentially available when using a hydrophyllic polymer such as NAFION in constructing the composite electrode.

To date efforts to utilize a hydrophyllic polymer such as NAFION have been largely discouraged by difficulty in forming a commercially acceptable composite electrode utilizing perfluorocarbon copolymer. While presently composites are formed by sintering particles of PTFE TEFLON until the particles coadhere, it has been found that similar sintering of perfluorocarbon copolymer can significantly dilute the desirable performance characteristics of perfluorocarbon copolymer in resulting composite electrodes.

For even hydrophyllic materials such as NAFION, a porous structure can considerably enhance contact between an electrocatalytically active component distributed throughout the structure and any reactants. Possible damage to ionic exchange functionality of a NAFION structure from the use of a heat activated pore precursor is likely at elevated temperatures. Other conventional pore forming techniques such as incorporation of a pore precursor into the fluorinated polymer structure followed by subsequent removal of the precursor often introduces additional processing steps making fabrication of a desired structure undesirably complicated.

DISCLOSURE OF THE INVENTION

The present invention provides an improved method for making porous fluorinated polymer structures. The method of the instant invention finds particular utility where desirable properties of fluorinated polymer being formed into structures would likely be adversely effected by conventional pore forming techniques or where application of conventional pore forming techniques is otherwise undesirable.

By the method, a porous resinous structure is formed by first blending a fluorinated polymer and a dispersion media and heating the blend to a temperature generally in excess of its melting temperature but below the point at which the dispersion media boils. This temperature is maintained until at least a portion of the fluorinated polymer dissolves in the dispersion media. The blend is formed into a desired shape, cooled to form a dispersion, and further cooled until droplets of the dispersion media appear by syneresis within the dispersion. Cooling is continued until the droplets crystallize. Dispersion media is removed from the dispersion at a temperature below the melting point of the droplets to leave pores within the fluorinated polymer structure.

Removal of the crystallized droplets in preferred modes can be accomplished by sublimation using heat or vacuum or may be accomplished by solvating the crystallized droplets with a solvent wherein the fluorinated polymer is substantially insoluble at solvation temperature.

The above and other features and advantages of the invention will become apparent from the following detailed description.

BEST EMBODIMENT OF THE INVENTION

The instant invention is initiated by blending a fluorinated polymer in a dispersion media. While any suitable or conventional fluorinated polymer may be utilized in preferred embodiments, this fluorinated polymer is frequently a fluororesin, generally a perfluorinated polymer or copolymer. In the best embodiment, this fluorinated polymer is a copolymeric perfluorocarbon such as NAFION. For implementing the instant invention, NAFION perfluorocarbon desirably should be available as an intermediate copolymer precursor which can be readily converted to a copolymer containing ion exchange sites. However, NAFION converted to contain ion exchange sites may be used quite satisfactorily.

The intermediate polymer is prepared from at least two monomers that include fluorine substituted sites. At least one of the monomers comes from a group that comprises vinyl fluoride, hexafluoropropylene, vinylidene fluoride, trifluoroethylene, chlorotrifluoroethylene, perfluoro(alkyl vinyl ether), tetrafluoroethylene and mixtures thereof.

At least one of the monomers comes from a grouping having members with functional groups capable of imparting cationic exchange characteristics to the final copolymer. Monomers containing pendant sulfonyl, carbonyl or, in some cases phosphoric acid based functional groups are typical examples. Condensation esters, amides or salts based upon the same functional groups can also be utilized. Additionally, these second group monomers can include a functional group into which an ion exchange group can be readily introduced and would thereby include oxyacids, salts, or condensation esters of carbon, nitrogen, silicon, phosphorus, sulfur, chlorine, arsenic, selenium, or tellurium.

Among the preferred families of monomers in the second grouping are sulfonyl containing monomers containing the precursor functional group $SO_2F$ or $SO_3$ alkyl. Examples of members of such a family can be represented by the generic formula of $CF_2=CFSO_2F$ and $CF_2=CFR_1SO_2F$ where $R_1$ is a bifunctional perfluorinated radical comprising 2 to 8 carbon atoms.

The particular chemical content or structure of the perfluorinated radical linking the sulfonyl group to the copolymer chain is not critical and may have fluorine, chlorine or hydrogen atoms attached to the carbon atom to which the sulfonyl group is attached, although the carbon atom to which the sulfonyl group is attached must also have at least one fluorine atom attached. Preferably the monomers are perfluorinated. If the sulfonyl group is attached directly to the chain, the carbon in the chain to which it is attached must have a fluorine atom attached to it. The $R_1$ radical of the formula above can be either branched or unbranched, i.e., straight chained, and can have one or more ether linkages. It is preferred that the vinyl radical in this group of sulfonyl fluoride containing comonomers be joined to the $R_1$ group through an ether linkage, i.e., that the comonomer be of the formula $CF_2=CFOR_1SO_2F$. Illustrative of such sulfonyl fluoride containing comonomers are:

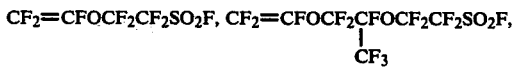

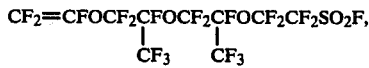

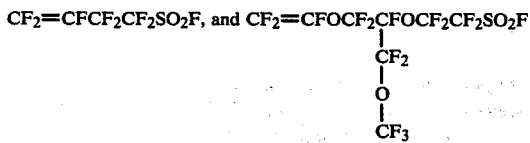

The corresponding esters of the aforementioned sulfonyl fluorides are equally preferred.

While the preferred intermediate copolymers are perfluorocarbon, that is perfluorinated, others can be utilized where there is a fluorine atom attached to the carbon atom to which the sulfonyl group is attached. A highly preferred copolymer is one of tetrafluoroethylene and perfluoro(3,6-dioxa-4-methyl-7-octenesulfonyl fluoride) comprising between 10 and 60 weight percent, and preferably between 25 and 40 weight percent, of the latter monomers.

These perfluorinated copolymers may be prepared in any of a number of well-known manners such as is shown and described in U.S. Pat. Nos. 3,041,317; 2,393,967; 2,559,752 and 2,593,583.

An intermediate copolymer is readily transformed into a copolymer containing ion exchange sites by conversion of the sulfonyl groups ($-SO_2F$ or $-SO_3$ alkyl) to the form $-SO_3Z$ by saponification or the like wherein Z is hydrogen, an alkali metal, or an alkaline earth metal. The converted copolymer contains sulfonyl group based ion exchange sites contained in side chains of the copolymer and attached to carbon atoms having at least one attached fluorine atom. Not all sulfonyl groups within the intermediate copolymer need be converted. The conversion may be accomplished in any suitable or customary manner such as is shown in U.S. Pat. Nos. 3,770,547 and 3,784,399.

Copolymeric perfluorocarbon having pendant carbonyl based cationic exchange functional groups can be prepared in any suitable or conventional manner such as in accordance with U.S. Pat. No. 4,151,053 or Japanese Patent Application No. 52(1977)38486 or polymerized from a carbonyl functional group containing monomer derived from a sulfonyl group containing monomer by a method such as is shown in U.S. Pat. No. 4,151,053. Preferred carbonyl containing monomers include $CF_3=CF-O-CF_2CF(CF_3)O(CF_2)_2COOCH_3$ and $CF_2=CF-O-CF_2CF(CF_3)OCF_2COOCH_3$.

Preferred copolymeric perfluorocarbons utilized in the instant invention therefore include carbonyl and/or sulfonyl based groups represented by the formula $-OCF_2CF_2X$ and/or $-OCF_2CF_2Y-B-YCF_2CF_2O-$ wherein X is sulfonyl fluoride ($SO_2F$) carbonyl fluoride (COF) sulfonate methyl ester ($SO_2OCH_3$) carboxylate methyl ester ($COOCH_3$) ionic carboxylate ($COO^-Z^+$) or ionic sulfonate ($SO_3^-Z^+$), Y is sulfonyl or carbonyl ($-SO_2-$ $CO-$), B is a cross-linking structure of the form $-O-$, $-O-O-$, $-S-S-$, and di and poly amines of the form $NH(CR_1R_2)_xNH$ where $R_1$, $R_2$ are selected from hydrogen, amines, and short chain alkanes and alkenes of less than about 6 carbon atoms and Z is hydrogen, an alkali metal such as lithium, cesium, rubidium, potassium and sodium, or an alkaline earth metal such as beryllium, magnesium, calcium, strontum, barium, radium or a quaternary ammonium ion.

Generally, sulfonyl, carbonyl, sulfonate and carboxylate esters and sulfonyl and carbonyl based amide forms of the perfluorocarbon copolymer are readily converted to a salt form by treatment with a strong alkali such as NaOH.

The dispersion medium selected for blending with the fluorinated polymer should have a solvating action upon the fluorinated polymer. Particularly effective solvents for perfluorinated vinyl ethers such as NAFION are shown in Table I. While any Table I solvent will satisfactorily dissolve a perfluorocarbon such as NAFION, mixtures of the solvents and other suitable or conventional solvents can, equally, be employed for implementing the instant invention. For that reason, the term dispersion media is used for referring to solvating materials used for dispersing the fluorinated polymer.

TABLE 1

SOLVENT CROSS REFERENCE TO PERFLUOROCARBON COPOLYMER CONTAINING VARIOUS PENDANT FUNCTIONAL GROUPS

| SOLVENT | FUNCTIONAL GROUP | | | |
|---|---|---|---|---|
| | $SO_2F$ | $COO^-Z^+$ | COO(ester) | $SO_3^-Z^+$ |
| Halocarbon Oil | X | | X | |
| perfluorooctanoic acid | X | | X | |
| perfluorodecanoic acid | X | | X | |
| perfluorotributylamine | X | | | |
| FC-70 available from 3M (perfluorotrialkylamine) | X | | | |
| perfluoro-1-methyldecalin | X | | | |
| decafluorobiphenyl | X | | | |
| pentafluorophenol | X | | | |
| pentafluorobenzoic acid | X | | | |
| N—butylacetamide | | X | | X |
| tetrahydrothiophene-1,1-dioxide (tetramethylene sulfone, Sulfolane ®) | | | | X |
| N,N—dimethyl acetamide | | | | X |
| N,N—diethyl acetamide | | | | X |
| N,N—dimethyl propionamide | | | | X |
| N,N—dibutylformamide | | | | X |
| N,N—dipropylacetamide | | | | X |
| N,N—dimethyl formamide | | | | X |
| 1-methyl-2-pyrrolidinone | | | | X |
| diethylene glycol | | | | X |

TABLE 1-continued

SOLVENT CROSS REFERENCE TO PERFLUOROCARBON COPOLYMER
CONTAINING VARIOUS PENDANT FUNCTIONAL GROUPS

| SOLVENT | FUNCTIONAL GROUP | | | |
|---|---|---|---|---|
| | $SO_2F$ | $COO^-Z^+$ | COO(ester) | $SO_3^-Z^+$ |
| ethylacetamidoacetate | | | | X |

Z is any alkali or alkaline earth metal or a quaternary ammonium ion having attached hydrogen, alkyl, substituted alkyl, aromatic, or cyclic hydrocarbon. Halocarbon Oil is a commercially marketed oligomer of chlorotrifluoroethylene.

Various dispersion media demonstrate perfluorocarbon copolymer solvating effects that differ with varying attached functional groups. Table I coordinates various dispersion media to perfluorocarbon copolymer attached functional groups with which they may be best utilized. Two solvents well-suited as dispersion media for the instant invention are perfluorooctanoic acid and perfluorodecanoic acid as these solvents readily form crystals at room temperature.

Typically dispersions are formed between perfluorocarbon copolymers and dispersion media by first blending the copolymer with the dispersion media. Generally perfluorocarbons of 1000 equivalent weight or greater are selected, but perfluorocarbon having carbonyl based functionality of 900 equivalent weight may be utilized effectively. The blend is then heated to a temperature in excess of the melting point of the solvent and generally above 50° C. Upper limitation upon this temperature generally is defined by the boiling point of the dispersion media except where substantially elevated temperatures would degrade the thermoresin. This boiling point will vary with the dispersion media being used and with such factors as pressure and the like under which the blend is maintained. Blending is frequently accomplished under an inerted atmosphere.

The blend is maintained at a suitable temperature at least until a significant portion of the fluorinated polymer perfluorocarbon has solvated into the dispersion media. It is not necessary that all fluorinated polymer solvate. It is highly desirable that at least sufficient dissolve to produce a dispersion or suspension having sufficiently small resin particles so as to resemble a sol-gel system in behavior.

Once desired sol-gel properties have been achieved, the solution or dispersion optionally is cooled where necessary to form a gelatinous dispersion. Using either of the dispersion or the gelatinous dispersion, a desired fluorinated polymer perfluorocarbon structure is formed. Formation can be in any suitable or conventional well-known manner such as by molding, rolling, injecting or the like. Formation is subject to the constraint that temperature of the malleable dispersion should remain above the melting point of the crystalline droplets during formation.

Under further cooling, droplets of relatively pure dispersion media are excreted from the dispersion by syneresis. These droplets tend to remain in the dispersion distributed in random fashion therethrough. Under further cooling, these droplets crystallize.

Dispersion media is removed from the formed structure in any suitable or conventional manner such as by placing the structure in a vacuum and/or heating the formed structure to sublimate the dispersion media. Extraction using a suitable solvent such as 2-propanol, acetone, or FREON, lightweight halogenated hydrocarbons, such as FREON 113, may also be used to effect dispersion media removal. To preserve the pore sites established by the crystalline droplets, removal of the dispersion media is best accomplished at a temperature below the melting point of the crystallized droplets. Removal of uncrystallized dispersion media can be in any suitable or conventional manner such as by application of vacuum and/or heat.

Upon removal of the dispersion media, particularly when using intermediate perfluorocarbon copolymer having unhydrolyzed pendant functionality, it has been found that the formed shape shrinks considerably, distorting the shape. Hydrolysis of the intermediate copolymer functionality can stabilize this shrinkage to a large measure. Hydrolysis can be accomplished in any suitable or conventional manner such as by immersion in weak NaOH or KOH for a period sufficient to hydrolyze most pendant functional groups prior to removal of the dispersion media.

The instant invention has proven useful in fabrication of so-called solid polymer electrolyte (SPE) electrodes. These SPE electrodes are comprised of an electrocatalytic material carried in a polymeric structure. Where the polymeric material is a perfluorocarbon copolymer such as NAFION, the NAFION structure often resembles a flat or decal applied to a cationic exchange membrane separating an electrolytic cell into anode and cathode compartments. The NAFION flat or decal, adhering to one membrane surface, functions as an electrode in electrolyzing contents of the electrolytic cell. The electrocatalytic substance carried within the NAFION structure provides the electrode functionality.

For the electrocatalytic substance to provide efficient electrode functionality, it is important that the electrocatalytic material throughout the NAFION structure be available to contact electrolyte being electrolyzed. One arrangement in which significant quantities of the electrolyte can be contacted with electrocatalyst distributed throughout a flat or decal is by making the decal porous. Electrolyte, penetrating the porous decal, contacts electrocatalyst material and reacts, the gaseous and other reaction products proceeding relatively unimpeded away from the reaction site through the porous structure.

Alternately, a microporous wall for separating anode and cathode compartments of an electrolytic cell can be fabricated using the method of the instant invention. These microporous separators where employing a NAFION cation exchange fluorinated polymer structure conveniently enhance movement of positively charged ions from one compartment to the other, while inhibiting movement of oppositely charged particles in a reverse direction.

The following examples are offered to more fully illustrate the invention.

EXAMPLE I

NAFION resin having $SO_2F$ functional groups and an equivalent weight of about 1100 was dissolved in perfluorodecanoic acid to yield a 5 percent (wt.) solution at 220° C. Dissolution was performed under an N₂ atmosphere. The solution was cast as 3 diaphragms each approximately 4 inches in diameter and about 1/16 inch in thickness. The castings were air cooled to room temperature. One diaphragm was vacuum dried only, another extracted for 24 hours with acetone, and the third extracted for 24 hours with 2-propanol. All were broken into pieces and subjected to electron microscopy which revealed a substantial porous structure throughout the diaphragm, the pores being of approximately 5 microns in their shortest dimension. Perfluorodecanoic acid crystals found in the unextracted diaphragm were also measured to be approximately 5 microns in their shortest dimension. The example was repeated using perfluorooctanoic acid with the same results.

EXAMPLE II

A diaphragm identical to those formed in Example I was first saponified in a 13 weight percent KOH solution at room temperature for 24 hours. Perfluorodecanoic dispersion media and crystals were then extracted using 2-propanol. The resulting diaphragm under electron micrscopy was found to have pores of a size approximately equal to the diaphragms of Example I but with the pores substantially more evenly distributed throughout the diaphragm structure. The diaphragm experienced substantially less shrinkage upon removal of the dispersion media as evidenced by reduced wrinkling and curling of the diaphragm.

EXAMPLE III 0.830 grams of Surlyn ®1652 resin, an E. I. duPont ethylene based carboxylic ionomer, and 7.470 grams of trichlorobenzene were heated to 85° C. to form a clear, viscous, gelatinous dispersion. A 3" diaphragm similar to those of Example I was cast and allowed to cool to room temperature. The trichlorobenzene dispersion media was then extracted using methylene chloride. Electron microscopy revealed a highly porous structure.

It has been found that crystallized material excreted from the cooling dispersion by syneresis tends to migrate to surfaces of the formed structure leaving behind a trail or track through the structure. These trails, about as wide as the dispersion media crystals, provide porosity to deep within the fluorinated polymer structure and the crystals, when removed, provide a substantially roughened and porous surface to the fluorinated polymer structure. In general, the surface was found to be less porous than the interior.

Size of crystals being formed can be at least partially controlled using thermal treatment such as quenching and or annealing. Seed nuclei, particles introduced into the blended fluorinated polymer and dispersion media can be used to precipitate crystal formation and thereby, at least in part, control crystal size.

While a preferred embodiment of the invention has been described in detail, it will be apparent that various modifications or alterations may be made therein without departing from the scope of the invention as set forth in the appended claims.

What is claimed is:

1. A method for forming a porous, resinous structure comprising the steps of:
   blending a fluorinated polymer or fluorinated copolymer and a dispersion media;
   heating the blend to a temperature between the melting point of the dispersion media and the boiling point of the dispersion media;
   maintaining the temperature until said fluorinated polymer or fluorinated copolymer at least partially dissolves in said dispersion media thereby forming a dispersion;
   forming a desired structure from the blend;
   cooling the blend to cause syneresis of droplets of dispersion media within dispersion; and
   continuing cooling causing crystallization of substantially all of said droplets; and
   removing the droplets to leave pores within the structure.

2. The method of claim 1 wherein the droplets are removed by dissolution in a solvent and at a temperature whereby the fluorinated polymer or fluorinated copolymer is substantially insoluble.

3. The method of claim 1 wherein the droplets are removed utilizing at least one of heat and vacuum.

4. The method of claim 1 wherein the blend is cooled to form a gelatinous dispersion prior to forming the desired structure.

5. A method for forming a porous resinous structure from a perfluorinated polymer comprising the steps of:
   blending the perfluorinated polymer and a dispersion media;
   heating the blend to a temperature between the melting point of the dispersion media and the boiling point of the dispersion media;
   maintaining of the temperature until the perfluorinated polymer at least partially dissolves in the dispersion media thereby forming a dispersion;
   forming a desired structure from the blend; cooling the blend to cause syneresis of droplets of dispersion media within the dispersion; and
   continuing cooling causing cyrstallization of substantially all of said droplets; and
   removing the droplets to leave pores within the structure.

6. The method of claim 5 wherein the droplets are removed by dissolution in a solvent and at a temperature whereby the resin is substantially insoluble.

7. The method of claim 5 wherein the droplets are removed utilizing at least one of heat and vacuum.

8. The method of claim 5 including the step of cooling the blend to form a gelatinous dispersion prior to forming the desired shape.

9. A method for making a porous copolymeric perfluorocarbon structure comprising the steps of:
   blending a copolymeric perfluorocarbon and a dispersion media;
   heating the blend to a temperature between the melt point of the dispersion media and the boiling point of the dispersion media;
   maintaining the temperature until the copolymeric perfluorocarbon at least partially dissolves in the dispersion media thereby forming a dispersion media;
   forming a desired structure from the blend;
   cooling the blend to cause syneresis of droplets of dispersion media within the dispersion; and
   continuing cooling causing crystallization of substantially all of the said droplets; and removing the droplets to leave pores within the structure.

10. The method of claim 9 wherein the copolymeric perfluorocarbon is polymerized from at least two monomers, one of said monomers consisting essentially of at least one fluorinated vinyl compound, and the other of said monomers consisting essentially of at least one monomer of the structures $CF_2=CFX$, $CF_2CFR_1X$ and $CF_2=CFOR_1X$ wherein $R_1$ is a bifunctional perfluorinated radical of from 2 to 8 carbon atoms can be at least once interrupted by an oxygen atom, and X is selected from a group consisting of sulfonyl fluoride, carbonyl fluoride, sulfonate ester and carboxylate ester, amides thereof and saponification products thereof.

11. The method of claim 9 wherein the dispersion media includes at least one of perfluorooctanoic acid and perfluorodecanoic acid.

12. The method of claim 11 wherein the droplets are removed by dissolution in a solvent and at a temperature whereby the resin is substantially insoluble.

13. The method of claim 12 wherein the solvent is one of acetone, 2-propyenl, and 1,1,2-trichloro-2,2,1-trifluoroethane used to dissolve the droplets at a temperature at or below a crystallizing point of the dispersion media.

14. The method of claim 9 wherein the droplets are removed utilizing at least one of heat and vacuum.

15. The method of claim 9 including the step of cooling the blend to form a gelatinous dispersion prior to forming the desired structure.

* * * * *

UNITED STATES PATENT AND TRADEMARK OFFICE
CERTIFICATE OF CORRECTION

PATENT NO. : 4,434,116
DATED : February 28, 1984
INVENTOR(S) : Michael J. Covitch It is certified that error appears in the above-identified patent and that said Letters Patent are hereby corrected as shown below:

In the ABSTRACT, line 5, delete "crystalizes" and insert --crystallizes--.

In the ABSTRACT, line 6, delete "crystalized" and insert --crystallized--.

In Column 10, line 37, delete "cyrstallization" and insert --crystallization--.

In Column 10, line 53, delete "melt" and insert --melting--.

Signed and Sealed this

Twelfth Day of June 1984

[SEAL]

Attest:

*Attesting Officer*

GERALD J. MOSSINGHOFF
*Commissioner of Patents and Trademarks*

UNITED STATES PATENT AND TRADEMARK OFFICE
CERTIFICATE OF CORRECTION

PATENT NO. : 4,434,116

DATED : February 28, 1984

INVENTOR(S) : Michael J. Covitch

It is certified that error appears in the above-identified patent and that said Letters Patent are hereby corrected as shown below:

In Claim 13, at line 5 of column 12, change "2-propyenyl" to read as --2-propanol--.

Signed and Sealed this

Second Day of October 1984

[SEAL]

Attest:

GERALD J. MOSSINGHOFF

Attesting Officer

Commissioner of Patents and Trademarks